Sept. 11, 1928.
R. W. CASH
CHILD'S VEHICLE
Filed June 20, 1927
1,684,298
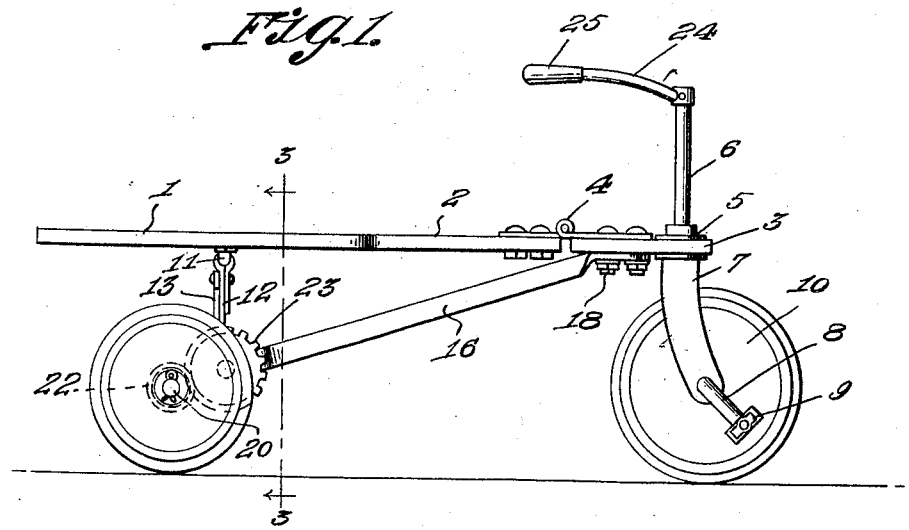
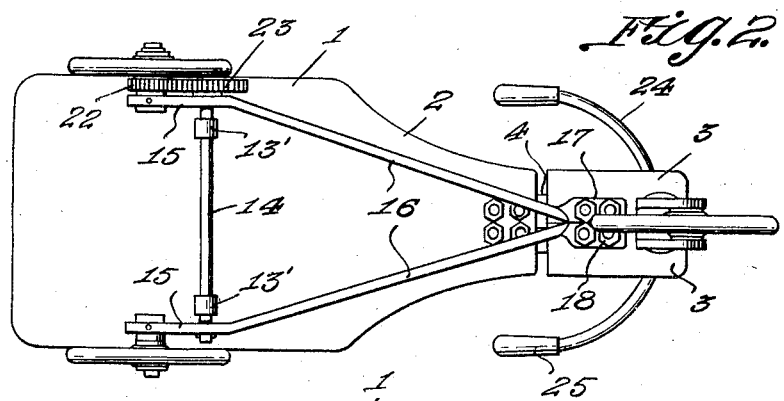
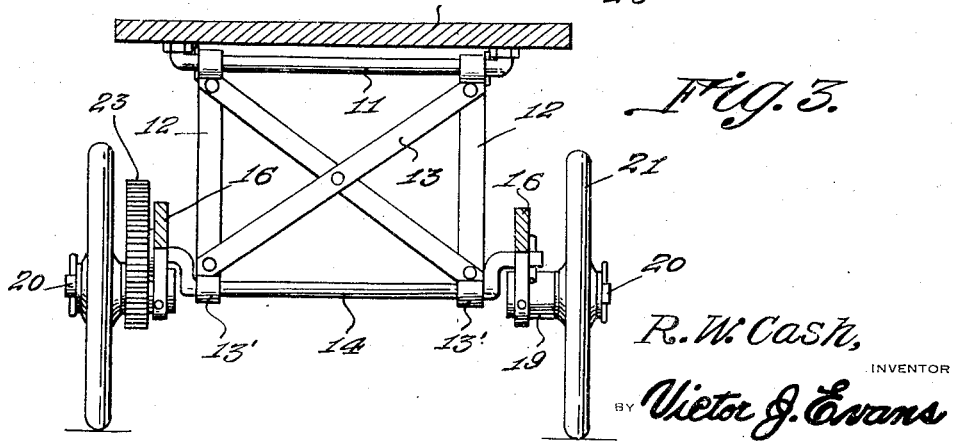
R. W. Cash, INVENTOR
BY Victor J. Evans ATTORNEY Patented Sept. 11, 1928.

1,684,298

UNITED STATES PATENT OFFICE.

ROBERT W. CASH, OF HANNIBAL, MISSOURI.

CHILD'S VEHICLE.

Application filed June 20, 1927. Serial No. 200,110.

This invention relates to velocipedes, and its general object is to provide a child's vehicle, that when propelled will subject the rider to a rocking motion which is uniform, with the result, the vehicle will afford wholesome and healthy amusement as well as exercise for children.

A further object of the invention is to provide a child's vehicle of the character and type referred to, that is extremely simple in construction and inexpensive to manufacture.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of the vehicle forming the subject matter of the present invention.

Figure 2 is a bottom plan view thereof.

Figure 3 is a sectional view taken on line 3—3 of Figure 1, looking in the direction of the arrows.

Referring to the drawings in detail, the reference numeral 1 indicates the rider's platform which as shown is provided with a reduced forward portion 2. The forward portion includes a separate part 3 to which is hingedly secured the remaining portion of the platform through the instrumentality of a hinge 4 of the usual strap and pintle construction.

Mounted in the forward portion of the separate part 3 is a bearing 5 within which is journaled the steering shaft 6. The steering shaft has formed on its lower end the usual fork 7 having journaled therein a pedal bar 8 which is provided with the usual pedals 9 and has secured thereto between the arms of the fork 7 the steering wheel 10.

Fixed to the bottom of the platform 1 is a substantially U-shaped rod 11 having secured thereto a frame which is in the nature of a pitman and includes spaced parallel bars 12 braced by cross bars 13 as best shown in Figure 3 of the drawings. The ends of the bars 12 are rounded upon themselves to provide bearings and the lower bearings which are indicated by the numeral 13' for distinction receive a crank shaft 14. The ends of the cranked portions of the crank shaft 14 are received in the parallel rear end portions 15 of a supporting frame which also include converging central portions 16 terminating in apertured ears 17 at their upper ends, and these ears 17 are secured to the underside of the separate part 3 by the bolt and nut connections 18 which secure a portion of the hinge 4 to said separate part as best shown in Figure 1 of the drawings.

Secured in the parallel rear end portions 15 are hubs 19 within which are arranged stub axles 20 for the rear wheels 21. One of the stub axles 20 has secured thereto a gear 22 which meshes with a gear 23 carried by the crank shaft 14 as best shown in Figure 2 of the drawings. The wheel 21 which is carried by the stub axle having fixed thereto the gear 22 is secured to its stub axle, and by this construction, it will be obvious that when the vehicle is propelled through the medium of its pedals 9, that power from the last mentioned wheel will be transmitted to the gear 22, thence to the gear 23 and to the crank shaft 14, which will give the platform 1 a rocking motion. By having the gear connection between the crank shaft 14 and the drive wheel, the rocking motion will be uniform as it is impossible for the parts to slip as will be apparent, with the result the rocking motion will not impair the nervous system of the rider and the vehicle as a whole will afford wholesome and healthy amusement exercise for children.

The steering shaft 6 has secured to its upper end the usual handle bars 24 which are provided with grips 25.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A child's vehicle of the character described comprising a platform including a body portion and a separate part which is hingedly secured to the body portion, steering means for said vehicle, a front wheel included in said steering means, a crank draft, means connecting said crank shaft to the body portion of the platform, rear wheels for said vehicle, and a gear connection between one of said rear wheels and said crank shaft.

2. A child's vehicle of the character described comprising a platform including a separate part hingedly secured to the remaining part, steering means for said vehicle and being carried by the separate part, a front wheel included in said steering means, a substantially U-shaped rod secured to said platform, a crank shaft, a frame between said crank shaft and rod for transmitting a rocking motion to said platform from said crank shaft, rear wheels for said vehicle and one of said rear wheels being geared to the crank shaft for operating the same.

3. A child's vehicle of the character described comprising a platform, a separate part included in said platform and being hingedly secured to the remaining part thereof, steering means for said vehicle and being carried by the separate part, handle bars and a front wheel included in said steering means, a supporting frame arranged at an inclination and having its upper end secured to the separate part, parallel rear end portions included in said supporting frame, hubs secured in said parallel rear end portions, stub axles mounted in said hubs, wheels journaled on said stub axles, a crank shaft journaled in said parallel rear end portions, a geared connection between one of said stub axles and said crank shaft, and means between said platform and crank shaft respectively for imparting rocking movement to the latter.

4. A child's vehicle of the character described comprising a platform including hingedly secured separate parts, steering means carried by one of said parts, a front wheel included in said steering means, a crank shaft, a supporting frame fixed to the last mentioned part and carrying said crank shaft, rear wheels for said vehicle, stub axles for said rear wheels and being carried by the supporting frame, means between one of said stub axles and crank shaft respectively for operating the latter, and means for rocking the other part of said platform from the crank shaft.

In testimony whereof I affix my signature.

ROBERT W. CASH.